United States Patent
Mueller et al.

(10) Patent No.: US 10,006,797 B2
(45) Date of Patent: Jun. 26, 2018

(54) MULTI-SYSTEM RADAR FOR MEASURING FILLING LEVELS

(71) Applicant: VEGA Grieshaber KG, Wolfach (DE)

(72) Inventors: Christoph Mueller, Oppenau (DE); Daniel Schultheiss, Hornberg (DE); Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 40 days.

(21) Appl. No.: 14/759,367

(22) PCT Filed: Feb. 28, 2014

(86) PCT No.: PCT/EP2014/053953
§ 371 (c)(1),
(2) Date: Jul. 6, 2015

(87) PCT Pub. No.: WO2014/135452
PCT Pub. Date: Sep. 12, 2014

(65) Prior Publication Data
US 2015/0338261 A1  Nov. 26, 2015

(30) Foreign Application Priority Data
Mar. 8, 2013 (EP) ..................... 13158454

(51) Int. Cl.
*G01S 7/03* (2006.01)
*G01F 23/284* (2006.01)
(Continued)

(52) U.S. Cl.
CPC .............. *G01F 23/284* (2013.01); *G01S 7/03* (2013.01); *G01S 7/032* (2013.01); *G01S 13/08* (2013.01);
(Continued)

(58) Field of Classification Search
CPC .......... G01F 23/284; G01S 7/03; G01S 7/032; G01S 7/036; G01S 13/08; G01S 13/10; G01S 13/34; G01S 13/87; G01S 13/88
See application file for complete search history.

(56) References Cited

U.S. PATENT DOCUMENTS 4,739,330 A * 4/1988 Lazarus ................ G01S 7/034
342/122
6,426,717 B1 * 7/2002 Maloratsky ............ G01S 13/08
342/120
(Continued)

FOREIGN PATENT DOCUMENTS

DE           19813604       9/1999
DE       10 2007 045013     4/2009
(Continued)

OTHER PUBLICATIONS

Rivenq-Menhaj et al. "Combining two radar techniques to implement a collision avoidance system", Measurement Science and Technology, vol. 9, No. 8, Aug. 1, 1998, pp. 1343-1346, DOI: 10.1088/0957-0233/9/8/030, 4pps.

*Primary Examiner* — Timothy A Brainard
*Assistant Examiner* — Daniel P Malley, Sr.
(74) *Attorney, Agent, or Firm* — Fay Kaplun & Marcin, LLP (57) ABSTRACT

A level radar is switchable between pulsed and FMCW radar methods. For example, the radar device may include two separate front ends which can be activated selectively via a logic control system. Upon switching to the respective other measurement principle, the evaluation software is also adapted accordingly. In this way, it is possible to use advantageous properties of both measurement methods in a targeted manner.

10 Claims, 5 Drawing Sheets

(51) Int. Cl.
  *G01S 13/08* (2006.01)
  *G01S 13/10* (2006.01)
  *G01S 13/34* (2006.01)
  *G01S 13/87* (2006.01)
  *G01S 13/88* (2006.01)

(52) U.S. Cl.
  CPC .............. *G01S 13/10* (2013.01); *G01S 13/34* (2013.01); *G01S 13/87* (2013.01); *G01S 13/88* (2013.01); *G01S 7/036* (2013.01)

(56) References Cited

U.S. PATENT DOCUMENTS

| | | | |
|---|---|---|---|
| 6,486,826 | B1 | 11/2002 | Cramer et al. |
| 6,684,696 | B2 * | 2/2004 | Schultheiss ........... G01F 23/284 73/290 R |
| 6,995,706 | B2 * | 2/2006 | Ohlsson ................ G01F 23/284 342/118 |
| 7,602,330 | B2 * | 10/2009 | Serban ................... H01Q 13/02 324/644 |
| 7,710,125 | B2 | 5/2010 | Schulteis |
| 2003/0142010 | A1 | 7/2003 | Ogawa |
| 2009/0235736 | A1 * | 9/2009 | Spanke ............... G01F 23/2962 73/290 V |
| 2012/0154203 | A1 * | 6/2012 | Vacanti .................... G01S 7/03 342/149 |
| 2012/0319891 | A1 * | 12/2012 | Edvardsson ........... H01Q 1/225 342/124 |
| 2014/0070985 | A1 * | 3/2014 | Vacanti .................. G01S 13/10 342/201 |

FOREIGN PATENT DOCUMENTS

| | | |
|---|---|---|
| TW | I333556 | 12/2008 |
| WO | 2007/043951 | 4/2007 |

* cited by examiner

MULTI-SYSTEM RADAR FOR MEASURING FILLING LEVELS

REFERENCE TO RELATED APPLICATIONS

This application claims the benefit of the filing date of the International Patent Application No. PCT/EP2014/053953 filed on 28 Feb. 2014, the disclosure of which is hereby incorporated herein by reference.

FIELD OF THE INVENTION

The invention relates to level measurement. In particular, the invention relates to an electronic module for a level radar, to a level radar comprising an electronic module of this type, to the use of an FMCW level radar and a pulsed level radar in combination with a switching device, and to a method for measuring a fill level.

BACKGROUND

Current level radar devices work using a particular radar principle in each case. The commercially available devices use either the pulsed or the FMCE radar method.

U.S. Pat. No. 7,710,125 B2 discloses a pulsed radar method in which a reference channel is used. DE 198 13 604 A1 discloses an FMCW radar method.

Pulsed level radar devices generate transmission pulses, which are emitted towards the filling material surface using a transmission antenna. These pulses are subsequently reflected (at least in part) from the filling material surface and possibly also from the container base, a separating layer between different filling media, and/or container installations or interference points. The reflected transmission pulse is subsequently received by a receiving antenna (which may also be the transmission antenna) and converted into an intermediate-frequency pulse. This is followed by analogue/digital conversion and signal processing, which should ultimately deliver the desired measurement result.

Another level radar principle is the FMCW principle, which is based on frequency-modulated continuous waves. FMCW level radar devices do not transmit (discrete) transmission signal pulses, but rather continuous waves from the antenna towards the filling material surface, specifically using a frequency sweep or a frequency ramp. In this case too, the reflected signal is received by a corresponding receiving antenna and converted into an intermediate-frequency signal, which is subsequently fed to an analogue/digital converter and downstream signal processing.

The pulse and FMCW radar devices may be used in a wide range of applications. The hardware of these two families of radar devices is very different in construction, in particular as regards the construction of the high-frequency (HF) front end and the actuation thereof. The HF front end consists of those assemblies of the radar device which are directly involved in generating the transmission signal and generating the intermediate-frequency reception signal.

SUMMARY

A first aspect of the invention specifies an electronic module for a level radar, which comprises a signal generating device and a switching device. The signal generating device comprises a first sub-assembly and a second sub-assembly.

The first sub-assembly is configured to generate a first, FMCW transmission signal, which is to be emitted towards a filling material surface by an antenna of the level radar, and to generate an intermediate-frequency (IF) reception signal. Here and in the following, "generating" an IF reception signal means that the radar device receives the reflected transmission signal and an IF signal is subsequently generated from the received signal by frequency conversion.

The second sub-assembly is configured to generate a second, pulse-form transmission signal, which is to be emitted towards the filling material surface by an antenna (possibly another antenna) of the level radar, and to generate an IF reception signal, which originates from the reflected second transmission signal received by the antenna.

The switching device is configured for selective (event-driven and/or user-driven) activation of the first sub-assembly and the second sub-assembly.

In other words, at any given moment, one of the two sub-assemblies may be selected and used to measure the fill level.

In one embodiment of the invention, the first sub-assembly comprises a first HF front end for generating the first FMCW transmission signal and for generating the corresponding IF reception signal. Likewise, the second sub-assembly may comprise a second HF front end for generating the pulse-form second transmission signal and for generating the IF reception signal.

In one embodiment of the invention, the first sub-assembly is integrated into the second sub-assembly. Alternatively, the second sub-assembly may be integrated into the first sub-assembly.

In this context, it is possible and may be provided that particular parts of the first sub-assembly are also used by the second sub-assembly or vice versa.

In a further embodiment of the invention, the switching device is configured for selective activation of the first sub-assembly and/or the second sub-assembly in a rigidly predetermined temporal sequence. For example, it may be provided that the two sub-assemblies are cyclically, alternately activated and deactivated.

In a further embodiment of the invention, the switching device is configured for activating the first sub-assembly and/or the second sub-assembly as a function of for example the echo signal amplitude of the reflected first transmission signal and/or the reflected second transmission signal. It is thus possible that when the echo signal amplitude for example in the near field of the antenna exceeds a particular value, the electronic module switches from the FMCW method to the pulse method, in that the first sub-assembly is deactivated and the second sub-assembly is activated.

In the reverse case, the electronic module can switch from the pulse method to the FMCW method when the echo signal amplitude of a particular echo (for example the fill level echo) falls below a particular threshold or is below this threshold.

In a further embodiment of the invention, the switching device is configured for activating the first sub-assembly and/or the second sub-assembly as a function of a measured fill level.

It may thus for example be provided that when the fill level is relatively high, in such a way that the filling material surface is in the near field of the antenna, the electronic module switches from the first sub-assembly to the second sub-assembly.

For low fill levels, it may for example be provided that the electronic module switches from the second sub-assembly to the first sub-assembly.

In a further embodiment of the invention, the switching device is configured for activating the first sub-assembly as a function of the presence of a multiple echo in the reflected second transmission signal.

If measurement is carried out by the pulse method, and it is established that there are unassignable echoes in the reflected second transmission signal, for example multiple echoes, the electronic module may switch to the FMCW method.

This may be advantageous, since in the case of an FMCW radar the multiple reflections can be imaged in higher IF frequency ranges, which can subsequently be filtered out.

In a further embodiment of the invention, the electronic module comprises a single digital signal processing device for processing the reflected transmission signals. An analogue/digital converter may be provided upstream from this digital signal processing device.

It is thus possible for both the FMCW intermediate-frequency signal (measurement signal proceeding from the reflected transmission signal) and the IF pulse signal to be processed by the same signal processing device. For this purpose, both the HF front end of the FMCW system and the HF front end of the pulse system are connected to the digital signal processing device via an analogue/digital converter.

A further aspect of the invention specifies a level radar comprising an electronic module of the type disclosed above and in the following.

In a further embodiment of the invention, the level radar comprises a single antenna to which the signal generating device is connected and which is configured to transmit the transmission signals and to receive the reflected transmission signals.

Alternatively, two separate duplexers may for example be provided, of which one is connected to the HF front end of the FMCW system and the other is connected to the HF front end of the pulse system.

A further aspect of the invention specifies the use of an FMCW level radar and a pulsed level radar in combination with a switching device for selective activation of the FMCW level radar and the pulsed level radar.

The two level radars may be separate devices, which for example each comprise an individual antenna and an individual digital signal processing system.

It may also be provided that each of the two level radars has an individual antenna, but the IF signals generated by the two level radars are processed in a shared digital signal processing device.

A further aspect of the invention specifies a method for measuring a fill level, in which an FMCW transmission signal is initially generated by a first sub-assembly of a signal generating device of the level radar. Subsequently, the FMCW transmission signal is emitted towards a filling material surface by an antenna of the level radar. This signal is subsequently reflected on the filling material surface (among other things) and the resulting reflected transmission signal is subsequently received by the level radar. An IF reception signal, which originates from the reflected first transmission signal received by the antenna, is subsequently generated from the received reflected first transmission signal.

Subsequently, a second sub-assembly of the signal generating device is activated, whereupon a second, pulse-form transmission signal is generated by the second sub-assembly and is subsequently emitted towards the filling material surface by an antenna of the level radar. The corresponding reflected transmission signal is received by the antenna and an IF reception signal is subsequently generated therefrom.

It is thus possible to switch between the pulse and FMCW radar methods.

In the following, the embodiments of the invention are described with reference to the drawings.

DETAILED DESCRIPTION OF EMBODIMENTS

The drawings are schematic and not to scale.

In the following description of the drawings, where like reference numerals are used in different drawings they denote like or similar elements. However, like or similar elements may also be denoted by different reference numerals.

Figure 1:
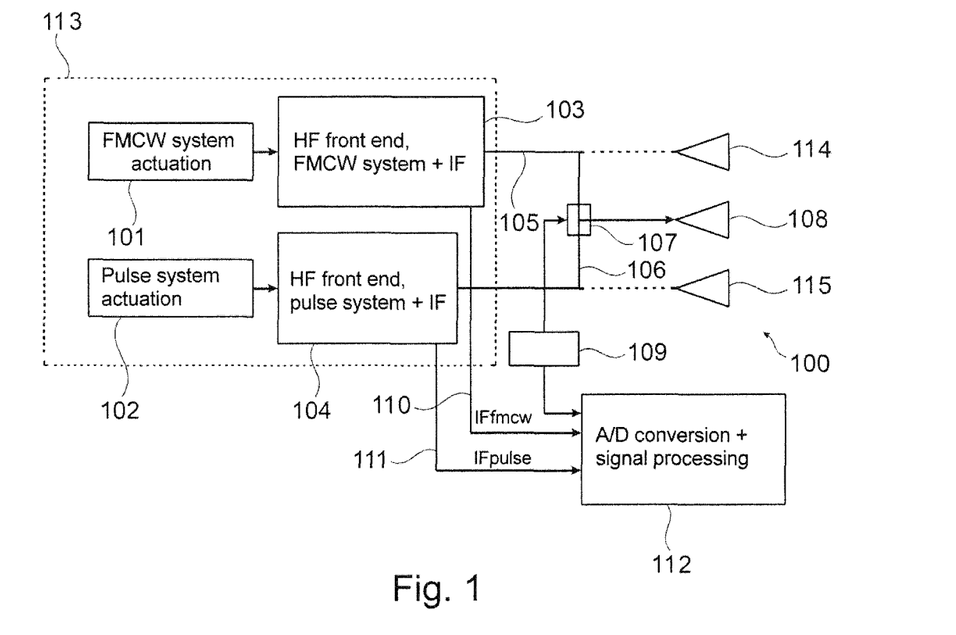
FIG. 1 shows components of a level radar according to an embodiment of the invention.

FIG. 1 shows components of a level radar 100 according to an embodiment of the invention. The level radar comprises an electronic module 112, 113 and one or more antennae 108 or 114, 115.

Depending on the application or on external factors, it may be more advantageous to operate the level radar device 100 in pulse mode or in FMCW mode. If there are large interference echoes or useful echoes, the FMCW radar method in some cases has problems in the region around the large signal, since the noise level around the large signal increases in a manner dependent on the system. The FMCW level radar is thus often "blind" in the direct vicinity of a large signal (reflected transmission signal). This also applies in the near field of the antenna because of the large leaked signal at the antenna coupling.

The pulse system does not have this disadvantageous effect. However, the pulse system can reach the sensitivity limit thereof more rapidly than the FMCW system. Specifically for very small echoes, the FMCW system has advantages over the pulse system in this respect.

Differences between the two systems are also significant for multiple reflections. In the pulse method, often many thousands of individual pulses are emitted per second, and can pass back and forth repeatedly between the filling material and the antenna within the measurement distance. This may result in echo signals (IF signals) which cannot be assigned to reflections on a real object, since the signal transit time is larger than would correspond to the maximum distance. Thus, multiply-reflected echoes may reach the antenna together with the primary reflection of a subsequent pulse.

By contrast, in the FMCW system the signals from multiple reflections are formed at higher IF frequencies which can subsequently be filtered out.

The signal generating device 113 of the level radar shown in FIG. 1 comprises an HF front end 103 which can generate an FMCW transmission signal. A control system is provided which can activate and deactivate the HF front end 103 by means of an actuation signal 101.

The signal generating device 113 also comprises a second HF front end 104, which can generate a pulse-form transmission signal, as is conventional for pulse radar devices. A control system is also provided for activating and deactivating the second HF front end 104, and generates the actuation signal 102.

The transmission signals produced in this manner are subsequently transmitted from the corresponding HF front end 103, 104 to the antenna 108, which emits the transmission signal towards the filling material surface, via the corresponding line 105, 106.

The signal lines 105, 106 are connected to the antenna 108 via an HF switch or coupler 107.

The HF switch may for example be switched via the control system 109. It would thus in principle be possible for the two HF front ends 103, 104 to generate FMCW transmission signals and pulse transmission signals continuously, but for only one of these two signals actually to be passed on to the antenna 108, depending on the setting of the HF switch 107.

In many cases, however, it will be expedient for the control system 101, 102 only to activate each HF front end 103, 104 at a given moment at which the corresponding HF front end is to be used for level measurement.

Alternatively, it is also possible to provide two antennae 114, 115, the first antenna 114 being connected to the first HF front end 103 and the second antenna 115 being connected to the second HF front end 104. In this case, no HF switch or coupler 107 is required.

The emitted transmission signal is subsequently reflected by the filling material surface, among other things, and the corresponding reflected transmission signal is received by the antenna 108, 114 or 115 and fed to the HF front end 103, 104 which generated the original transmission signal. From the transmission signal received in this manner, the corresponding HF front end 103, 104 generates an intermediate-frequency signal, as is known in the prior art. The two HF front ends are connected via an individual signal line 110, 111 to a signal processing device 112 having upstream analogue/digital conversion. The generated IF signals are thus initially digitised and subsequently subjected to signal processing so as ultimately to determine the fill level.

FIG. 1 accordingly shows an embodiment having completely separate front end branches for the pulse system and the FMCW system. The respectively active branch is connected through to the analogue/digital converter.

The two front ends can thus be activated selectively by a corresponding logic signal 101, 102 from the control system. The interface for the evaluation electronics may be an analogue/digital converter. Upon switching to the respective other measurement principle, the evaluation software has to be adapted as well as the hardware. For this evaluation software adaptation, the control system 109 is connected to the signal processing device 112.

At this point it should be noted that all of the control components may be integrated into a single part.

The signals 101 and 102 may be simple logic signals, or else contain necessary signals which are specific to the front end, for example clock signals or current/voltage supplies.

Figure 2:
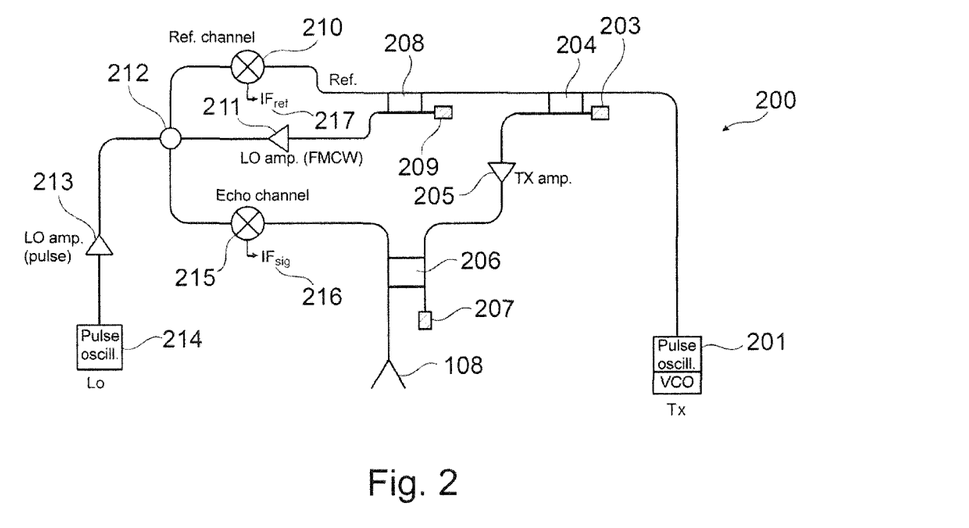
FIG. 2 shows components of a level radar according to a further embodiment of the invention.

FIG. 2 shows a further embodiment of a level radar 200. In the front end region there are components which occur in both systems (the FMCW system and the pulse system). This applies for example to the HF mixer (echo channel), the oscillator and also coupler structures.

FIG. 2 shows the layout of a pulse system which is supplemented by small extensions to an FMCW system. Depending on the measurement principle, different components should subsequently be switched on or off.

Figure 3:
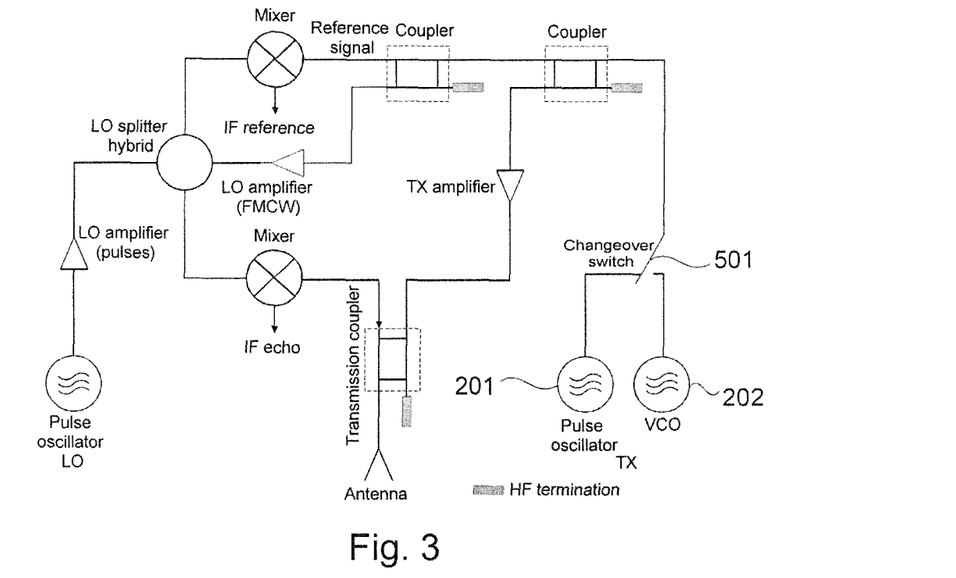
FIG. 3 shows components of a level radar according to a further embodiment of the invention.
Figure 4:
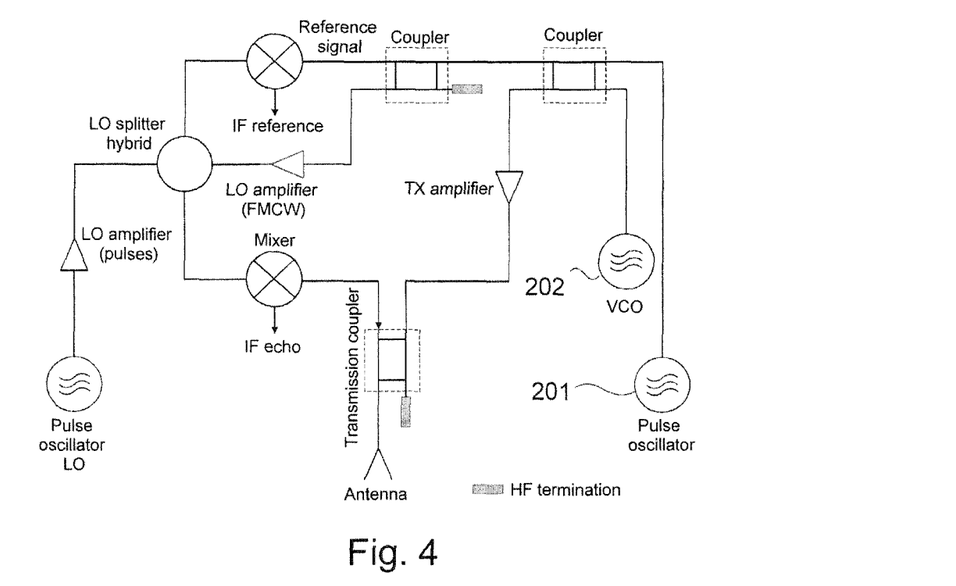
FIG. 4 shows components of a level radar according to a further embodiment of the invention.

Details of this embodiment can be varied. Alternative embodiments are shown in FIGS. 3 and 4. For example, a special transmission oscillator 201 may be provided, which can be operated both in pulse operation and in FMCW operation (in this case as a VCO).

Alternatively, a pulse oscillator 201 and a separate VCO 202 may be provided, which can selectively be operated separately from one another, as is shown in FIGS. 3 and 4. In the embodiment of FIG. 3, a changeover switch 501 is provided which can switch back and forth between the pulse oscillator 201 and the VCO 202. This changeover switch is not provided in the embodiment of FIG. 4. Here, the respectively required oscillator is activated and the other oscillator 202, 201 is deactivated. As regards the circuitry, the two oscillator signals are brought together via the coupler 204, and the HF termination 203 is not provided.

The end user can for example set the measurement principle of the level radar himself. It may also be provided that the evaluation software decides on one or other measurement principle on the basis of the current echo relationships.

Cyclical alternation back and forth between the two measurement principles, in other words in a rigidly predetermined temporal sequence, may also be provided.

The signal processing may also be configured to be variable. For example, the measurement value may be determined separately for each system (FMCW and pulse), or it is provided that the evaluation results which the signal processing device (not shown in FIG. 2) derives from the FMCW mode and the pulse mode are taken into account to supplement one another.

Thus, for example, there may initially be an FMCW measurement and subsequently a pulse measurement. The two measurements may supply different results, but these can be taken into account together in an overall evaluation. Thus, the measurement results of the FMCW measurement may for example be used in particular for identifying multiple echoes and low-amplitude echoes, whilst the result of the pulse measurement is taken into account for the near field or other high-amplitude echoes.

The signal generated by the pulse oscillator 201 (which may optionally also operate as a VCO, cf. FIG. 2) is fed to a coupler 204 which divides the signal. One part is assigned to the transmission channel; the second part forms the reference channel in the case of pulse operation, and in the case of FMCW operation this signal is used as an LO for the echo channel mixer.

An output of the coupler 204 (transmission channel) leads via a TX amplifier (transmission amplifier) 205 to a transmission coupler 206, the first output of which is connected to an HF termination 207. The other output leads to the antenna 108, which emits the transmission signal to the filling material. The echo channel connected to the antenna 108 likewise comprises a mixer 215, which is connected on the one hand via the coupler 206 to the antenna 108 and on the other hand to the splitter 212, and the output 216 of which emits the intermediate frequency measurement signal (in other words the reflected transmission signal which has been converted into an intermediate frequency signal).

The reflected transmission signal is received by the antenna 108 and subsequently transmitted to a mixer 215 via the coupler 206.

A further coupler 208 is connected to the second output of the first coupler 204. The second input of the further coupler 208 is connected to an HF termination 209.

The reference channel mixer is connected to the upper output of the coupler 208. The reference signal (only for the pulse mode) is generated by way of the mixer 210 located in this reference channel, said mixer being supplied with the signal of the pulse oscillator 201 on one side and with the signal of the LO pulse oscillator 214, via the LO amplifier 213 and the splitter 212, on the other side. The mixer output 217 provides the intermediate frequency reference signal. This reference duct is not required for FMCW operation and is not evaluated.

Finally, an LO pulse oscillator 214 is provided, the output signal of which is amplified by the LO amplifier (pulse) 213 and fed to the splitter 212. The second output signal of the coupler 208 is also fed to the splitter 212 after being amplified by the LO amplifier (FMCW) 211.

In the case of an FMCW measurement, the LO amplifier (FMCW) 211 is switched on and the LO amplifier (pulse) 213 and also the LO pulse oscillator 214 are switched off. The echo channel mixer obtains the LO (local oscillator) signal thereof from the transmission oscillator 202 (VCO) or 201 (combined pulse oscillator and VCO) via the couplers 204, 208, the amplifier 211 and the splitter 212. In the case of a pulse measurement, the LO amplifier is switched on/off the other way around. In this case, the LO pulse oscillator 214 is switched on again. The echo channel mixer thus now obtains the LO signal thereof from the LO pulse oscillator 214, just like the reference signal mixer 210.

A special TX oscillator 201 may be provided which can be operated both in pulse and in FMCW operation (FIG. 2).

In a further embodiment, a pulse oscillator 201 and a VCO 202 are provided separately and operated selectively (FIG. 3 or FIG. 4).

In further embodiments, systems are illustrated which do not have a reference channel for the pulse operation. The number of couplers and the hardware complexity overall are reduced considerably.

Amplifiers for the transmission signal (TX) and the LO signal are shown in the shown embodiments, but may also not be provided if the oscillator amplitude is sufficient.

Figure 8:
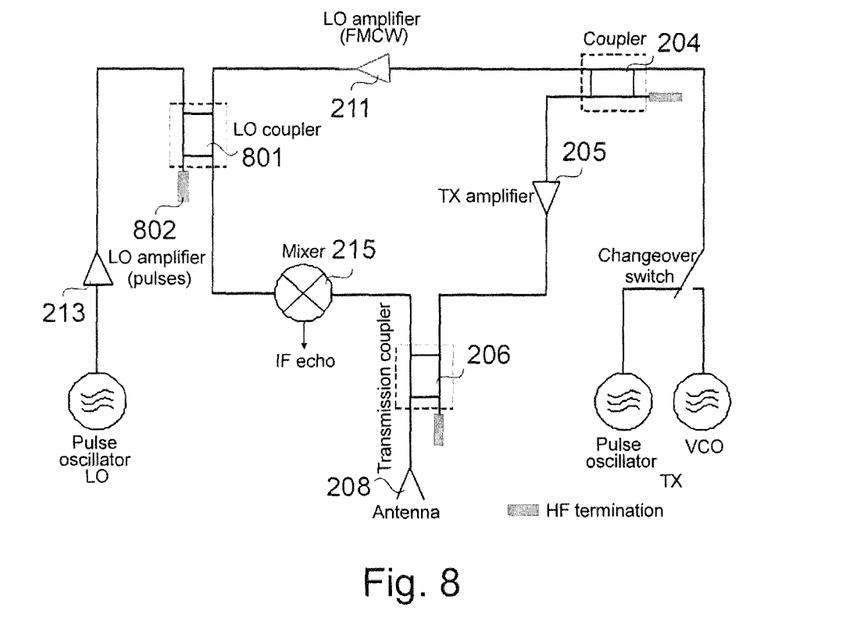
FIG. 8 shows components of a level radar according to a further embodiment of the invention.
Figure 9:
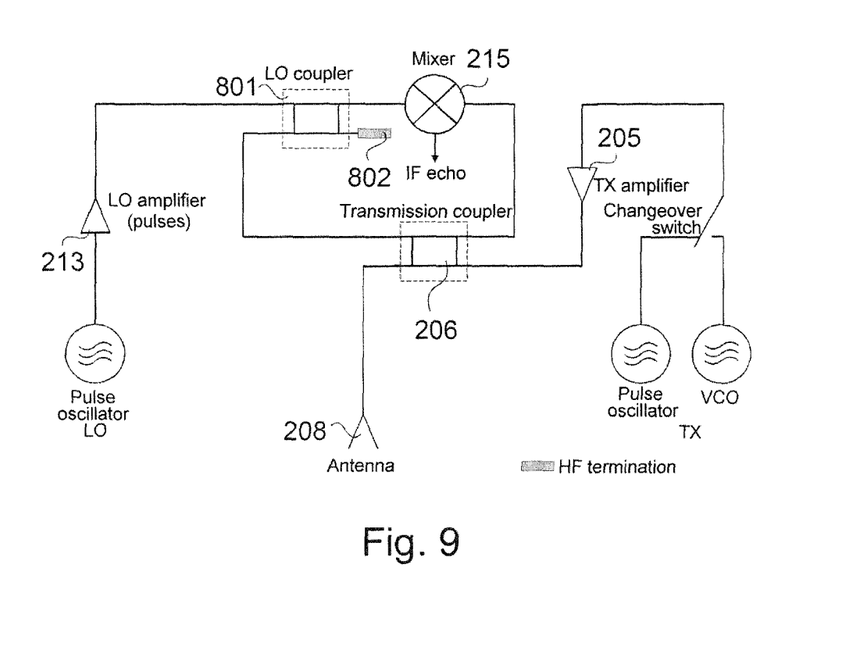
FIG. 9 shows components of a level radar according to a further embodiment of the invention.

FIGS. 8 and 9 show embodiments for pulse operation, but without a reference channel.

In the embodiment of FIG. 8, unlike in FIG. 2, the coupler 208, the mixer 210 and the splitter 212 are not provided. Instead of the splitter 212, an LO coupler 801 is provided. The first input of the coupler 801 is connected to the LO amplifier 211 and the second input to the LO amplifier 213. The first output is connected to the mixer 215 of the echo channel and the second output to an HF termination 802.

In the embodiment of FIG. 9, an LO coupler 801 having HF termination 802 is also provided, as well as the transmission coupler 206. As in FIG. 8, the LO coupler 801 is connected to the LO amplifier 213. It is further connected to the transmission coupler 206. The mixer 215, which emits the IF echo signal and is connected to the antenna 208 via the transmission coupler 206, is located at the fourth terminal of the LO coupler 801.

Figure 5:
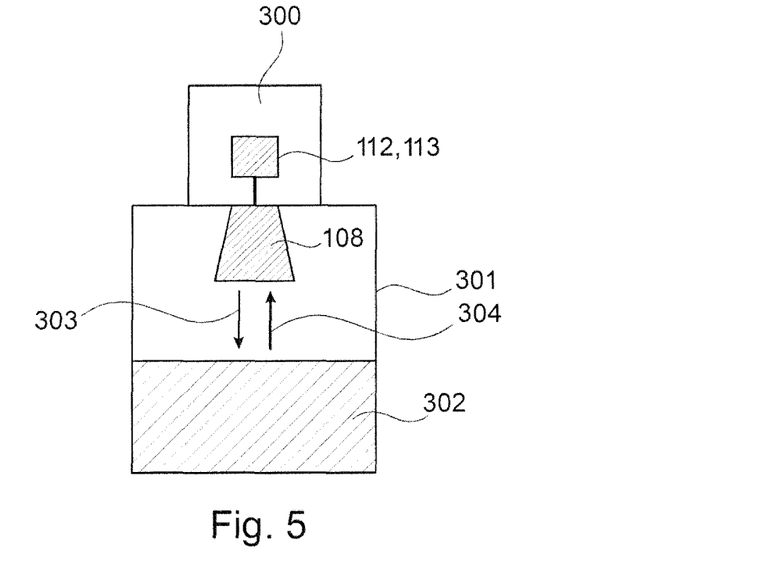
FIG. 5 shows a level radar according to a further embodiment of the invention, installed in a container.

FIG. 5 shows a level radar 300, which is installed in a container 301 and which comprises an electronic module having a signal generating device 113 and a switching device 112. The electronic module is connected to an antenna 108, which emits the transmission signal 303 towards the filling material 302. This transmission signal is subsequently reflected (at least in part), and the reflected transmission signal 304 is received by the antenna 108 and passed on to the electronic module, where it is converted into an intermediate-frequency signal, digitised and subsequently subjected to further signal processing.

Figure 6:
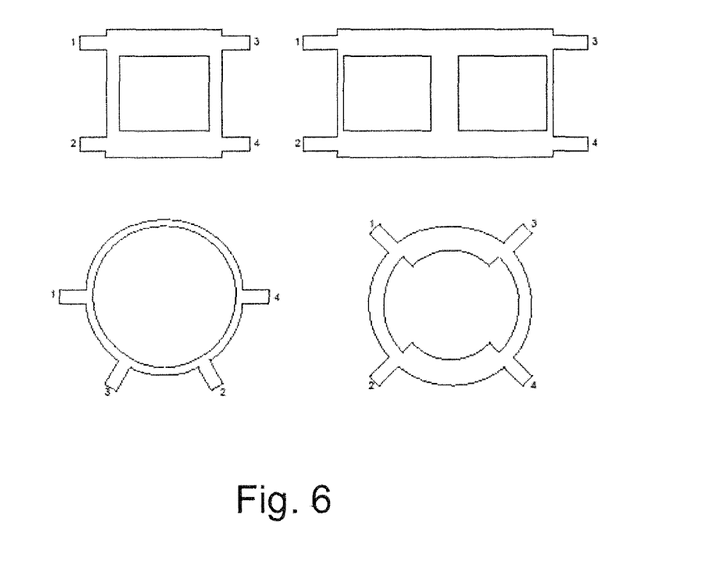
FIG. 6 shows examples of couplers which can be used in the embodiments of FIGS. 2, 3 and 4.

FIG. 6 shows four examples of couplers 204, 206, 208, 801, and splitters 212, which may be used in the embodiments of FIGS. 2, 3, 4, 8 and 9. A two-armed branchline coupler (90° hybrid) is shown at the top left, and alongside it a three-armed branchline coupler for larger bandwidths (90° hybrid). A ring coupler (rat-race, 180° hybrid) is shown at the bottom left, and alongside it a two-armed branchline coupler (90° hybrid) in ring form. The coupler 206 may also be replaced with a circulator, in which case the HF termination 207 need not be provided.

Figure 7:
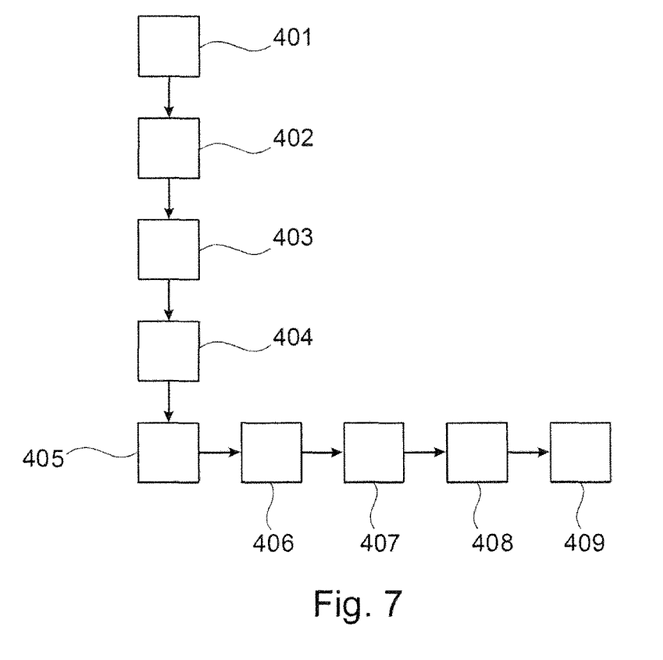
FIG. 7 is a flow chart of a method according to an embodiment of the invention.

FIG. 7 is a flow chart of a method according to an embodiment of the invention. In step 401, a pulse transmission signal is generated by a sub-assembly of a signal generating device of a level radar. Subsequently, in step 402, this pulse transmission signal is emitted toward the filling material by means of a transmission antenna of the level radar. In step 403, the reflected transmission signal is received by the antenna and passed on to the electronic module, where it can be converted into an IF signal, digitised and subjected to subsequent signal processing. On the basis of particular circumstances, which occur for example with the form of the most recently received echo curve and/or when the user intervention occurs and/or as a result of a pre-programmed cyclical sequence, a different sub-assembly of the signal generating device is now activated (step 404).

In step 405, this second sub-assembly generates an FMCW transmission signal, which in step 406 is emitted via said antenna towards the filling material surface, reflected, and received by the antenna again. In step 407, an IF reception signal, which originates from the reflected transmission signal received by the antenna, is generated from this reflected and received transmission signal. This reception signal is subsequently digitised and subjected to an evaluation in step 408. In step 409, the other sub-assembly is deactivated again and measurement continues using the first sub-assembly.

For completeness, it should be noted that "comprising" and "having" do not exclude the possibility of other elements or steps, and "an" or "a" does not exclude the possibility of a plurality. It should further be noted that features or steps which have been disclosed with reference to one of the above embodiments may also be used in combination with other features or steps of other above-disclosed embodiments. Reference numerals in the claims should not be treated as limiting.

The invention claimed is:

1. An electronic module for a level radar, comprising:
   a signal generating device including:
      a first sub-assembly generating a first FMCW transmission signal, which is to be emitted towards a filling material surface by an antenna of the level radar, the first sub-assembly generating an IF reception signal, which originates from the reflected first transmission signal received by the antenna; and
      a second sub-assembly generating a second pulse-form transmission signal, which is to be emitted towards the filling material surface by an antenna of the level radar, and the second sub-assembly generating an IF reception signal, which originates from the reflected second transmission signal received by the antenna; and a switching device selectively activating the first sub-assembly and the second sub-assembly, the switching device configured to cyclically, alternatively activate the first sub-assembly and the second sub-assembly in a predetermined temporal sequence.

2. The module according to claim 1, wherein the first sub-assembly includes a first HF front end generating the first FMCW transmission signal and the IF reception signal and wherein the second sub-assembly includes a second HF front end generating the pulse-form second transmission signal and the IF reception signal.

3. The module according to claim 1, wherein the first sub-assembly is integrated into the second sub-assembly.

4. The module according to claim 1, wherein the switching device is configured for activating the first sub-assembly or the second sub-assembly as a function of an echo signal amplitude of the reflected first or second transmission signal.

5. The module according to claim 1, wherein the switching device is configured for activating the first sub-assembly or the second sub-assembly as a function of a measured fill level.

6. The module according to claim 1, wherein the switching device is configured for activating the first sub-assembly as a function of the presence of a multiple echo in the reflected second transmission signal.

7. The module according to claim 1, wherein the switching device is configured for activating the first or second sub-assembly as a function of an occurring noise level or sound properties.

8. A level radar, comprising:
a signal generating device including:
    a first sub-assembly generating a first FMCW transmission signal, which is to be emitted towards a filling material surface by an antenna of the level radar, the first sub-assembly generating an IF reception signal, which originates from the reflected first transmission signal received by the antenna; and
    a second sub-assembly generating a second pulse-form transmission signal, which is to be emitted towards the filling material surface by an antenna of the level radar, and the second sub-assembly generating an IF reception signal, which originates from the reflected second transmission signal received by the antenna; and a switching device selectively activating the first sub-assembly and the second sub-assembly, the switching device configured to cyclically, alternatively activate the first sub-assembly and the second sub-assembly in a predetermined temporal sequence.

9. The level radar according to claim 8, further comprising:
a single antenna,
wherein the signal generating device is connected to the single antenna, the single antenna being configured to emit the first FMCW and second pulse-form transmission signals and receive the reflected first and second transmission signals.

10. A method for measuring a fill level, comprising:
generating a first FMCW transmission signal by a first sub-assembly of a signal generating device of a level radar;

emitting the first FMCW transmission signal towards a filling material surface by an antenna of the level radar;

receiving the first transmission signal reflected on the filling material surface;

generating an IF reception signal, which originates from the first transmission signal reflected by the antenna;

activating a second sub-assembly of the signal generating device;

generating a second pulse-form transmission signal by the second sub-assembly;

emitting the second transmission signal towards the filling material surface by an antenna of the level radar; and generating an IF reception signal, which originates from the reflected second transmission signal received from the antenna;

wherein the first sub-assembly and the second sub-assembly are cyclically alternately activated in a predetermined temporal sequence.

* * * * *